(12) United States Patent
Lawande et al.

(10) Patent No.: US 6,405,247 B1
(45) Date of Patent: *Jun. 11, 2002

(54) METHOD AND APPARATUS FOR OPERATING THE INTERNET PROTOCOL OVER A HIGH-SPEED SERIAL BUS

(75) Inventors: Sachin S. Lawande, Mount Prospect; Salim Ling, Skokie, both of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,712

(22) Filed: Apr. 16, 2001

Related U.S. Application Data

(63) Continuation of application No. 08/850,406, filed on May 2, 1997, now Pat. No. 6,219,697.

(51) Int. Cl.$^7$ .............................................. G06F 13/00
(52) U.S. Cl. ........................ 709/221; 709/220; 709/222; 710/10
(58) Field of Search ................................ 709/221, 220, 709/222, 238, 224, 227, 249, 250; 710/10, 9, 3, 107, 106; 370/257; 712/1

(56) References Cited

U.S. PATENT DOCUMENTS

| | | | | |
|---|---|---|---|---|
| 5,764,930 A | * | 6/1998 | Staats | 709/107 |
| 5,809,331 A | * | 9/1998 | Staats et al. | 710/10 |
| 5,935,208 A | * | 8/1999 | Duckwall et al. | 709/221 |
| 5,938,752 A | * | 8/1999 | Leung et al. | 710/126 |
| 6,038,628 A | * | 3/2000 | Leung et al. | 710/126 |
| 6,131,119 A | * | 10/2000 | Fukui | 709/224 |
| 6,138,196 A | * | 10/2000 | Takayama et al. | 710/105 |
| 6,157,972 A | * | 12/2000 | Newman et al. | 710/100 |
| 6,160,796 A | * | 12/2000 | Zou | 370/257 |
| 6,219,697 B1 | * | 4/2001 | Lawande et al. | 709/221 |
| 6,243,774 B1 | * | 6/2001 | Eide et al. | 710/103 |

* cited by examiner

Primary Examiner—Glenton B. Burgess
Assistant Examiner—Abdullahi E. Salad
(74) Attorney, Agent, or Firm—McDonnell Boehnen Hulbert & Berghoff

(57) ABSTRACT

A method and apparatus of integrating the IEEE 1394 protocol with the IP protocol in which the IEEE 1394 high speed serial bus operates as the physical and link layer medium and the IP operates as the transport layer. There are differences in the protocols which require special consideration when integrating the two protocols. The IEEE 1394 configures packets with memory information and the IP operates under channel based IO thereby necessitating a modification of the data transfer scheme to accomplish IP transfers over the IEEE 1394. Further, due to differences in packet headers, the IEEE 1394 packet header is modified to encapsulate IP packets. Moreover, in order to determine network packets quickly and efficiently, an identifier is inserted in each network packet header indicating that the packet should be processed by the network. Finally, in order to support the ability to insert or remove nodes on the network without a loss of data, the IP interface must not be disturbed. This is accomplished by maintaining constant IP addresses across bus resets which are caused by insertion or removal of nodes from the network.

12 Claims, 14 Drawing Sheets

Microfiche Appendix Included
(3 Microfiche, 196 Pages)

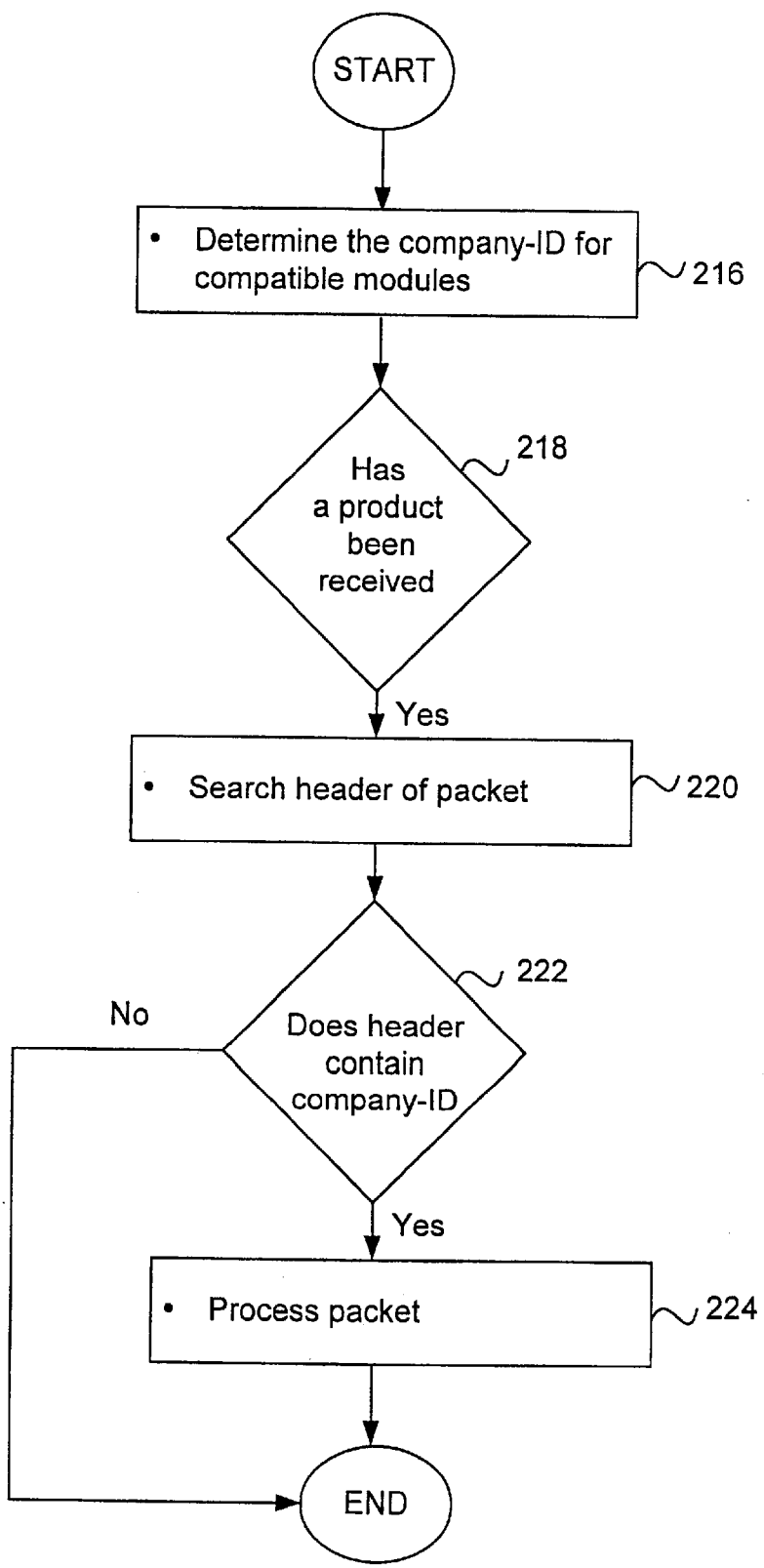

METHOD AND APPARATUS FOR OPERATING THE INTERNET PROTOCOL OVER A HIGH-SPEED SERIAL BUS

This is a continuation a of application Ser. No. 08/850,406, filed May 2, 1987 issued as U.S. Pat. No. 6,219,697.

MICROFICHE APPENDIX

This application contains a microfiche appendix, which consists of three sheets of microfiche and a total of 196 frames.

NOTICE REGARDING COPYRIGHT

A portion of the disclosure of this patent document contains matter subject to copyright protection. The copyright owner has no objection to the facsimile reproduction by anyone of the patent disclosure document as it appears in the Patent and Trademark Office files and records but otherwise retains all copyrights whatsoever.

BACKGROUND OF THE INVENTION

A. Field of the Invention

This invention relates to the operation of a high speed data network which interconnects different application modules, and more particularly relates to a method and apparatus for operating IP protocol over a high-speed bus such as an IEEE 1394 high-speed bus.

B. Description of Related Art

When communication is necessary among heterogeneous systems (i.e. different vendors and standards), the software to communicate between the systems can be extremely difficult to develop. The potential exists for different vendors to use different data formats and data exchange conventions so that the differing machines are unable to "talk" directly to each other. To combat this potential problem, standardizing organizations have established computer architectures and structures to facilitate the communication between heterogeneous systems. One accepted structuring technique is layering. The communications functions are partitioned into a vertical set of layers whereby each layer performs a related subset of functions required to communicate with another system. Each layer then relies on the next lower layer to perform more primitive functions and to conceal the details of those functions as well as to provide services to the next higher layer. In this manner, the larger problem of communicating between differing systems can be structured into a discrete subset of layered subproblems.

One model of layering is the Open Systems Interconnection (OSI). The Open Systems Interconnection uses the layering framework with the goal to create an open systems networking environment where any vendor's computer system, connected to any network, can freely share data with any other computer system on that network or linked network. Many computer systems have a structure based on the OSI model, which organizes the communication process into seven different categories and places. these categories in a layered sequence based on their relation to the user.

The three lowest layers in the OSI model (layers 1 through 3) are the physical, link and network layers, each layer dealing with network access. The physical layer is concerned with transmission of unstructured bit stream over physical media, such as cables, and is considered to be the lowest layer. The link layer provides for the reliable transfer of information across the physical layer, sending blocks of data with the necessary synchronization, error control, and flow control. The network layer determines how data is transferred between computers and addresses routing within and between individual networks.

One example of a physical and link layer medium is the IEEE 1394 high speed serial bus. IEEE 1394 is a data transport bus that supports up to 63 nodes per bus and up to 1023 buses. The bus can be a tree or daisy-chained (devices connected in series) or a combination of both and can support both asynchronous and isochronous data. Further, the Internet Protocol (IP) is a connectionless protocol (i.e. mode of operation in which a packet header is encoded with sufficient information to permit independent delivery of the packet) that operates at the network layer. The IP protocol is a standard describing software that monitors the internetwork addresses for different nodes, routes outgoing messages, and recognizes incoming messages. IP, which works in conjunction with the Transmission Control Protocol (TCP), (and identified as TCP/IP) provides communication across interconnected networks, between computers with diverse hardware architectures and various operating systems. TCP and IP are two of the more widely used protocols in the family of Internet protocols.

However, there are several problems when integrating the IEEE 1394 protocols with the IP protocols. First, there are differences in the protocols between the sender and the receiver of data. The IEEE 1394 is designed as a memory read/write bus where the sender of data must have information on the receiver's memory structure. In particular, the sender or initiating node reads from or writes to the memory location of the receiver or target note. The sender node is required to know the memory architecture of the receiving node in order to perform memory read/writes. In contrast, the IP protocol transfers data without the sender knowing about the receivers memory architecture. As such, the data transfers of IP cannot be directly accomplished on the IEEE 1394 architecture. Further, the IEEE 1394 is essentially a connectionless acknowledged protocol. Each IEEE 1394 packet of data, other than a packet that is broadcast to all nodes, generates an acknowledgment from the receiver. If the acknowledgment indicates a failure in the reception of the packet, the sender retransmits the packet. Second, the packet formats of the IEEE 1394 are incompatible with the IP packet formats. A packet header is the portion of the message sent that contains information which guides the message to the correct destination.

Third, there are addressing problems when using the IP protocol as the transport protocol for data transfers over the IEEE 1394 bus. The IP protocol uses logical addresses to identify each node in the network with the IP addresses as 32-bit values depicted in dotted-decimal fashion (e.g., 149.112.234.1 for IP host and 149.112.234.2 for another IP host). An application on one IP host that needs to transfer data to another application on a different IP host will use the IP address to direct the data transfer (e.g., use the IP address 149.112.234.2 to transfer data to the second application). However, the IEEE 1394 protocol requires the use of a physical address of the destination node. Thus, a conversion between the IP address to the IEEE address must be accomplished before the data can be handed to the physical layer for transmission.

Prior methods of obtaining the physical address, such as through the use of the Address Resolution Protocol (ARP), either cannot or should not be used with the IEEE 1394 network. Ordinarily, when an IP host wishes to obtain the address of a destination node, it broadcasts an ARP query with the IP address of the destination node. All IP hosts on the local network receive the ARP broadcast and check to see if the IP address contained in the ARP query is the same as the local IP interface address. The node whose address is equal to the address contained in the ARP query responds with an ARP response that contains the physical. address for that node. However, most ARP implementations cannot support the dynamic changing of the hardware address and therefore cannot be used on an IEEE 1394 bus. The IEEE 1394 physical address is generated dynamically by the IEEE 1394 and can change upon a bus reset. The physical address of an IP interface is set at the time of interface initialization and cannot be changed without bringing the IP interface down and then reinitialized with a new physical address. If this is done, all of the IP traffic on the interface is stopped and is only restarted after the IP interface is up again. Any TCP connections using that interface will be torn down.

Further, the requirement of broadcasting an ARP inquiry and the address resolution latency are undesirable. All nodes on the network are forced to process the ARP request to determine if they have to respond to it. The determination of the physical address must be done quickly enough so that no data is lost on the network. During this determination, the data is buffered. However, the data can only be buffered for a finite period of time due to physical constraints in terms of memory requirements on the buffers and due to specification constraints in terms of the requirements of some protocols to process a packet of information within a certain period of time.

Another problem when integrating various heterogeneous systems is determining whether the data formats conform to a certain standard or a certain computer architecture. Components, such as computers and modules on a network, receive many packets of information. In order to determine if the component should process the information, the component must assess if the data format conforms with a certain standard or certain computer architecture. If the data format does not conform, the component should not process the data. Otherwise, the data format should be processed. Further, in order for a component to be able to process the data more quickly, the component must quickly determine whether the packets conforms. Otherwise, data might be lost.

Previous components have attempted to determine whether a packet should be processed by examining the format of the packet. For example, if the component is looking for a packet which is formatted under the IP protocol, the component examines the packet to determine if the specific fields within the packet are within the bounds of a packet which is formatted under the IP protocol. If the packet is within bounds, the component processes the packet. Otherwise, the packet is ignored.

There are several problems with this scheme. First, the determination whether to process the packet is fairly intensive in terms of deciding whether specific fields in the packet conform to the IP protocol. Second, a component can still be "fooled" into believing that a packet does conform to a certain protocol simply because the packet falls within the bounds of that protocol.

SUMMARY OF THE INVENTION

In accordance with a first aspect of the invention, a method of reconfiguring the bus line without disturbing the on-going traffic on the bus is provided. The method includes the step of obtaining the non-changeable address of the component, which does not change during a bus reset, and the changeable address, which is assignable. The method further includes the step of placing the non-changeable address and changeable address in a look-up table. In addition, the network is reconfigured. The method further includes the step of determining the non-changeable address of the component. The look-up table is examined for the changeable address which corresponds to the non-changeable address. In addition, the component is assigned the changeable address which was placed in the look-up table prior to bus reset.

In accordance with a second aspect of the invention, a data processing system is provided. The data processing system includes a bus line and a module connected to the bus line. The module has a memory which contains a network identifier address. In addition, the data processing system includes a network manager connected to the bus line. The network manager has a memory device and a processor with the memory device having a look-up table containing the network identifier address and the changeable address. The processor has a comparator for comparing the network identifier address in the look-up table with the network identifier address in the module.

In accordance with a third aspect of the invention, a method for determining whether to process an incoming data stream to a component is provided. The method includes the step of determining the first packet identifier contained in the first memory device of the first component. The method further includes the step the packet is formed having a field containing the first packet identifier. In addition, the packet is sent onto the bus. The method further includes the step of determining by the second component the second packet identifier contained in the second memory device of the second component. Further, the second component receives the packet from the bus and parses through the fields to obtain the first packet identifier. The method further includes the step of comparing by the second component the parsed data with the second packet identifier, and processing the packet if the parsed data equals the second packet identifier.

In accordance with a fourth aspect of the invention, a data processing system is provided. The data processing system includes a bus line and two modules connected to the bus line. The first module has a first memory and a first processor, with the first memory containing a first packet identifier. The first processor accesses the first memory, obtaining the first packet identifier, and forms a data stream containing the first packet identifier. The second module has a second memory and a second processor, with the second memory containing a second packet identifier. The second processor has a comparator which compares the second packet identifier with the first packet identifier in the data stream.

In accordance with a fifth aspect of the invention, a method for sending a packet of data on a physical and link layer configured for packets which include memory architecture information in the packet is provided. The method includes the step of receiving the packet of information at the link layer from the network layer from the sender module. The method also includes the step of placing header information into the packet which does not include memory architecture information about the receiver module and which conforms to sending the information via channel based I/O. In addition, the packet is transported to the receiver module via the physical layer.

Accordingly, a primary object of the invention is to integrate the IP protocol with an IEEE 1394 high-speed bus.

Another object of the invention is to provide a means for inserting or removing nodes from a network at any level in the computer architecture without disturbing the on-going traffic on other nodes in the network.

Still another object of the invention is to transfer IP packets on the IEEE 1394 using channel based input/output.

Still yet another object of the invention is to efficiently and correctly determine whether to process incoming packets of data These and other objects, features, and advantages of the present invention are discussed or apparent in the following detailed description.

BRIEF DESCRIPTION OF THE DRAWINGS

A presently preferred embodiment of the present invention is described herein with reference to the drawings wherein:

FIG. 9 is the flow chart of the determination whether a packet is sent from a compatible module.

DETAILED DESCRIPTION OF THE PREFERRED AND ALTERNATIVE EMBODIMENTS OF THE INVENTION

Figure 1:
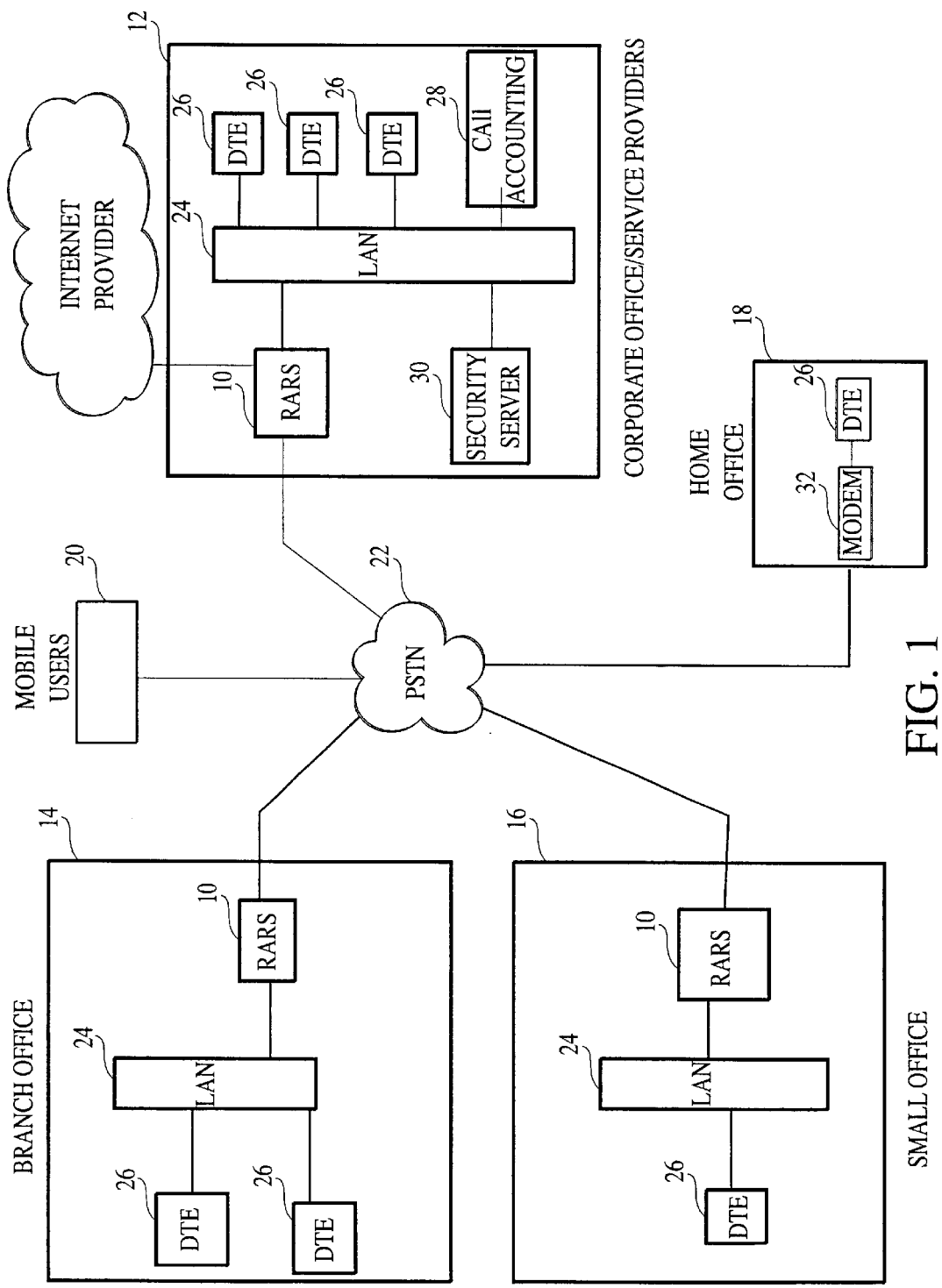
FIG. 1 is an exemplary application of the Remote Access and Routing Server.

FIG. 1 refers to a Remote Access and Routing Server (RARS) 10 for a data processing system. The Remote Access and Routing Server 10 integrates separate data communication entities via a public switched telephone network (PSTN) 22. The Remote Access and Routing Server 10 provides remote access for mobile users and for individuals at home offices, access nodes for Internet service providers, and dial-up local area network to local area network (LAN-to-LAN) routing capabilities for geographically disperse corporate enterprises. For example, FIG. 1 discloses one application of the Remote Access and Routing Server 10 which allows communication between corporate offices (central and branch offices) 12, 14, 16, homes and mobile users 18, 20. In a Corporate Office or Internet Service Provider 12, the Remote Access and Routing Server 10 is connected to a LAN 24 which is in turn connected to Data Terminating Equipment (DTE) 26, such as a computer, and to other devices 28, 30. The Internet Service Provider 12 is also connected to the Internet. Branch Offices 14 or Small Offices 16 may also be connected to the PSTN 22 via the Remote Access Routing Server 10. Further, Mobile users 20 and Home Office users 18 may connect to the PSTN 22 via a modem 32 or other data communication device.

Figure 2:
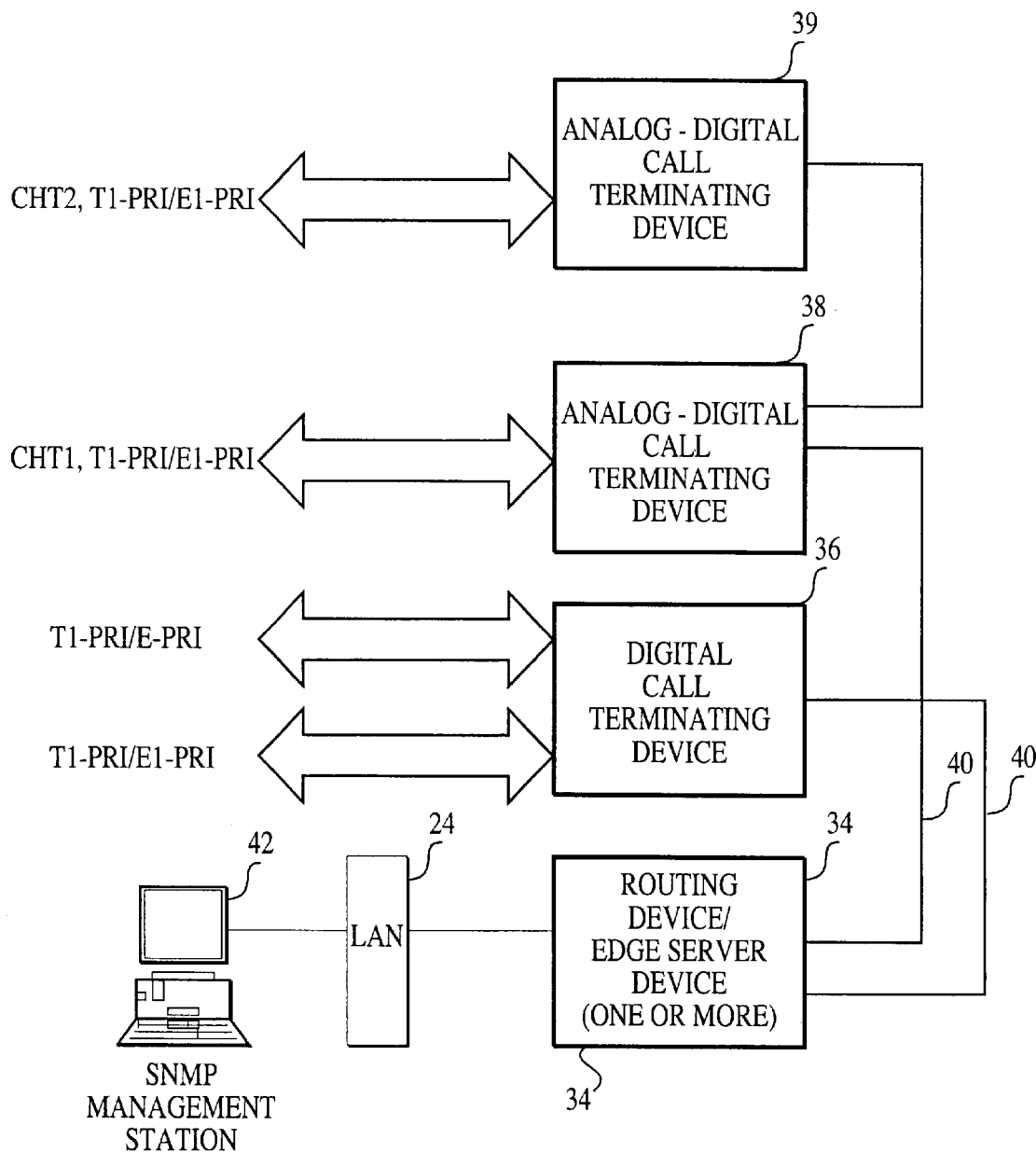
FIG. 2 is block diagram of an example of a network and devices comprising the Remote Access and Routing Server.

The Remote Access and Routing Server 10 is comprised of a stackable architecture whereby various suboperations of the Remote Access and Routing Server 10 are separated at the device level into a Routing Device 34, a Digital Call Terminating Device 36, and Analog-Digital Call Terminating Device 38, allowing for expandability of the system based on a user's needs. The user may expand the system by simply adding slices to the stack in modular increments. In this manner, the user's system may grow to match the user's needs. The Remote Access and Routing Server 10 may also be combined into one system without separation at the device level. Referring to FIG. 2, the modules are connected via a network 40 with each device having its own power supply. The network allows inter-device communication in the system architecture. The Routing Device 34, also known as a Router, the Digital Call Terminating Device 36 and the Analog-Digital Call Terminating Device 38 are interconnected by the network 40, which is based upon the IEEE 1394 (Firewire). The Routing Device 34 is connected to a local area network (LAN) 24 which is in turn connected to a management station 42. Each device is connected to the network 40 via a node which has an address. A single device may have multiple nodes connected to the network 40. Further, each node attached to the network 40 has equal access to the data transfer services and share the available bandwidth with other nodes. Each of the components have connectors to the network 40 and can support a nominal 200 mb/s data rate. This application incorporates by reference U.S. Pat. No. 5,528,595 by inventors Walsh et al. entitled Modem Input/Output Signal Processing Techniques, which describes further aspects of the Analog-Digital Call Terminating Device and the Routing Device.

Figure 3:
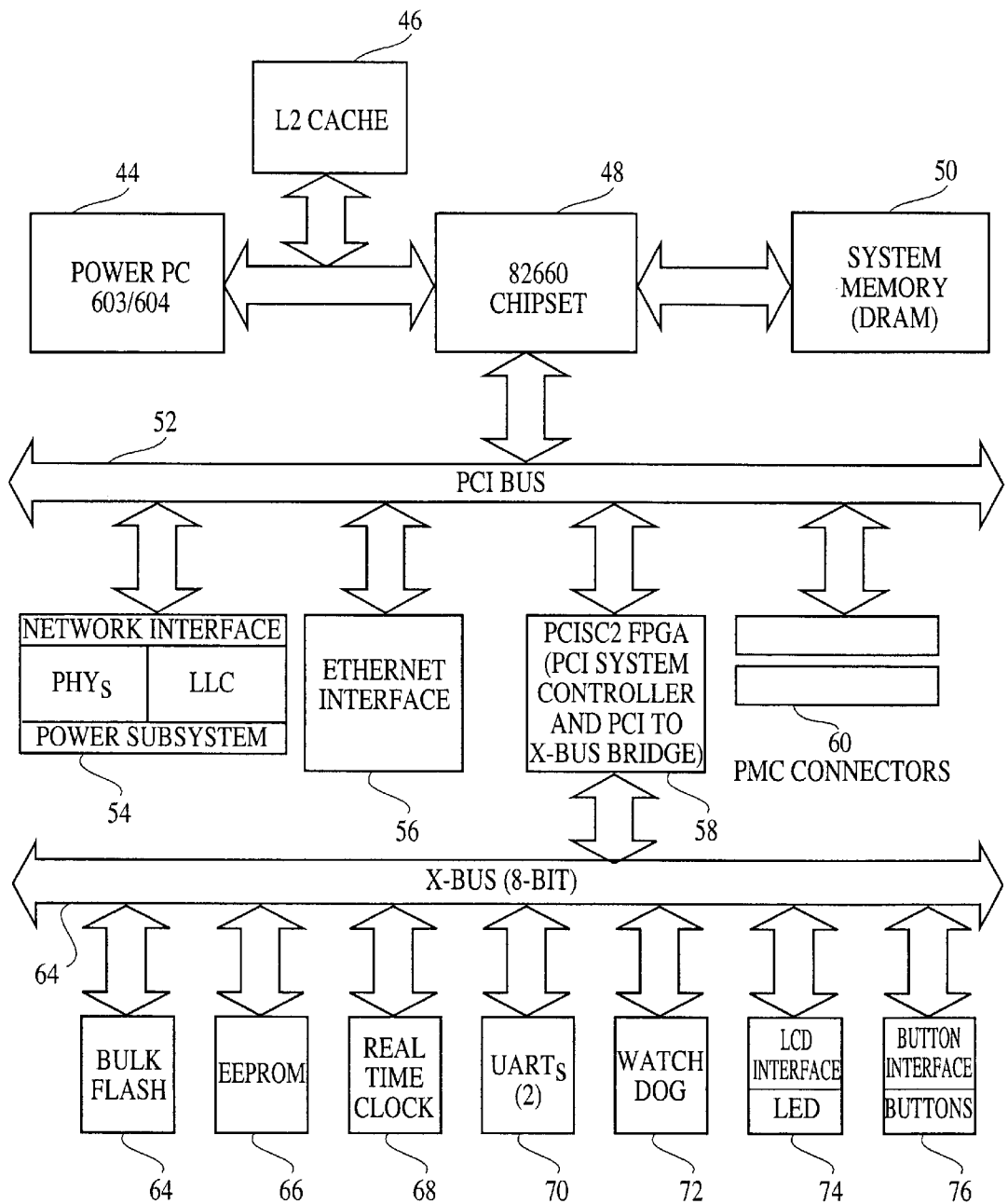
FIG. 3 is a block diagram of the Routing Device.

The Routing Device 34 contains the router engine, the 10/100 Mbit Ethernet® interface 56 and a network interface 54, referring to FIG. 3. The Routing Device 34 is the center of system management. It provides the functionality to route all of the protocols supported by the Remote Access and Routing Server 10, is the simple network management protocol (SNMP) agent for management of the system, and allows for synchronous serial interfaces for connection to a LAN or a Wide Area Network (WAN).

An Edge Server Device is a device which is placed at the edge of the Local Area Network. The Edge Server Device is similar to the Routing Module in that it implements the network management components required as the primary network manager module on the network. The Remote Access and Routing Server 10 may be implemented using a Routing Device 34, an Edge Server Device or a combination of both devices.

The Digital Call Terminating Device 36 contains two T1/E1 Primary Rate Interface (PRI) connections, a network interface and the necessary hardware to terminate two spans worth of Integrated Services Digital Network (ISDN) originated calls. Depending on the country, either T1 or E1 is used. T1 is a standard for digital transmission in the United States, Canada, Hong Kong and Japan with a capacity of 1.544 M bits per second. E1 is a standard for digital transmission in Europe with a capacity of 2.048 M bits per second. Call traffic, following processing by the Digital Call Terminating Device 36, is passed to the Routing Device 34, which in turn communicates with a LAN 24.

The Analog-Digital Call Terminating Device 38 is a single-span T1/E1 access module designed to terminate calls of both analog and digital origin. This call traffic, following processing by the Analog-Digital Call Terminating Device 38, is passed to the Routing Device 34, which in turn communicates with a LAN 24. As shown in FIG. 2, a second Analog-Digital Call Terminating Device 39 can be integrated into the network 40. Therefore, the Analog-Digital Call Terminating Devices can be place in a star or daisy-chain topology with a second Analog-Digital Call Terminating Device acting as a repeater.

Referring to FIG. 3, a block diagram of the Routing Device 34 is shown. The central processing unit for the Routing Device 34 is a PowerPC™ 603 44 manufactured by IBM and Motorola and operating at 200 MHz. Because the printed circuit board will use a BGA package for the PowerPC™, and will contain a 2.5 Volt regulator, the printed circuit board can accommodate any PowerPC™ 603 or 604 device for adjustments as central processing unit capacity requirements change. The CPU chipset 48 is the IBM 82660 family consisting of the 82663 buffer and 82664 controller. This chipset 48 provides a glueless interface between the PowerPC™ 44, system memory (DRAM) 50, L2 cache 46, and the on-board PCI bus 52.

The L2 cache 46 consists of a single 16K×15 cache tag RAM with 4 32K×32 SSRAM devices to support the 512 KB of L2 cache. Further information on the IBM 82660 chipset 48 is in IBM27-82660 PowerPC™ to PCI Bridge and Memory Controller User's Manual, IBM, SC09-3026-00, 1996.

Main memory is 64 bits in width and consists of 16 MB of base memory plus field upgrade capacity to 144 MB. Base memory consists of eight 1 M×16 60 ns EDO DRAM devices soldered to the PCB for-reliability and low cost. The PCB contains one 168-pin DIMM socket for memory expansion to 24, 32, 48, 80, or 144 MB total capacity using a 8, 16, 32, 64, or 128 MB DIMM respectively. Expansion memory is EDO for higher performance. Boot memory contains the CPU's primary bootstrap code to be executed upon hardware reset and consists of a software-locked segment of main storage flash. This allows primary bootstrap code to be field-updated in the unlikely event that becomes necessary. Storage memory (Bulk Flash 64) is erasable and supports the operational code and the application's file system. It consists of 4 MB of flash memory, with provision for larger factory-installed sizes. The printed circuit board supports four flash devices so that the board is populated with two 2 MB×8 devices for a total of 4MB. The maximum configuration is 8 MB with 2 MB×8 devices. Memory is accessible as 32 64 KB blocks per device with boot memory and storage memory share the same physical device.

Storage memory consists of two Intel 28F016SC devices or two AMD 29F016 devices, with separate programming algorithms for the Intel or AMD devices. A command user interface serves as an interface between the CPU and the internal operation of the device. A valid command sequence written to the device initiates automatic execution of algorithms and timings for block erase, byte write, and lock-bit configuration operations. A block erase operation erases one of the 64 KB blocks typically within one second wherein each block may be erased 100,000 times.

The Non-Volatile Memory is an EEPROM 66 consisting of 512 bytes. The EEPROM 66 is written with the serial number and configuration data as part of the manufacturing process. Non-volatile memory consist of one NM93LC66 device with locations individually addressable (as 16-bit "registers"). The non-volatile device is accessed serially via a three-wire interface (select, clock, data); however, this serial access is under control of the PCISC2 FPGA, which makes the EEPROM 66 visible to software through a conventional register set.

Two UARTs (Universal Asynchronous Receiver Transmitter) 70 are supported in the Routing Device, as shown in FIG. 3. The first is a Console Port UART and is customer-accessible via a front-panel DB9 connector. The UART complies with the ANSI RS-232-E and ITU V.28 standards, is configured as a DTE interface, supports hardware RTS-CTS flow control, contains 16-byte transmit and receive FIFOs, and supports the required asynchronous communication rates of 9600, 19200, 38400, 57600, and 115200 Baud. The Console Port UART consists of one 16C550CFN device clocked at 3.6864 MHz and one Maxim MAX241 transceiver.

The second UART is a Debug UART. The debug port is terminated internal to the Routing Device via a header, is compliant with ANSI RS-232-E and ITU V.28 standards, is configured as a DTE interface, supports hardware RTS-CTS flow control, contains 16-byte transmit and receive FIFO's, and supports the required asynchronous communication rates of 9600, 19200, 38400, 57600, and 115200 Baud. The debug port consists of one 16C550CFN device clocked at 3.6865 MHz, and one Maxim MAX241 transceiver.

The Real-Time Clock 68 is used to provide date (year, month, day of month, day of week) and time (hours, minutes, seconds, hundredths). In addition to time/date availability, the number of bits of general purpose non-volatile RAM, and automatic storage of the date/time of last power failure. The Real-Time Clock 68 consists of a DP8573A device with a dedicated 32.768 kHz crystal and capacitor backup power.

The Watchdog Timer 72 detects unusual operation by interrupting and then resetting the module if the timer 72 has been enabled but not been tickled in nominally 1.6 seconds. Upon reset, the watchdog timer is disabled, and requires an explicit software operation to enable it. Once enabled, software cannot disable it without allowing it to expire. Expiration of the watchdog causes a non-maskable interrupt (NMI) to occur. The Watchdog Timer 72 consist of one Maxim MAX697 supervisor device with assistance from the PCISC2 FPGA.

Voltage tolerance monitoring is provided on two critical voltages (+5.0 Volts, +3.3 Volts). Monitoring of +5.0 Volts is provided by the power supply unit. Monitoring of the Power supply unit generated +5.0 and +3.3 Volts is performed by on-board Routing Device circuitry, as discussed subsequently. If any voltage becomes out-of-tolerance, the board will be placed in a reset condition and held until the out-of-tolerance condition passes. The +5.0 and +3.3 voltages are monitored on-board so as to generate a proper power-up reset signal to the board. The +2.5 Volt signal, generated on-board, is not monitored, because it is derived from a high-MTBF regulator, and because a reset signal is more accurately derived by monitoring that regulator's input voltage (+5.0/+3.3). On-board voltage monitoring will be performed by the voltage detection subsystem of the Maxim MAX 697 supervisor device.

The Routing Device 34 is equipped with a reset button 76 which causes an immediate hardware reset of the entire module. This is required for debugging and catastrophic error recovery under otherwise unanticipated conditions. The button 76 drives the Maxim MAX 697 supervisor device, which is responsible for reset generation and timing.

A digital thermometer-thermostat device is used to sense on-board temperature. The device's alarm setpoint is programmed at time of board manufacture so that an alarm is generated and routed to a status register when this setpoint is exceeded. This setpoint is the "hard" setpoint beyond which proper operation cannot be guaranteed. The temperature sensor device is accessed serially via a three-wire interface (select, clock, data); however, this serial access is under control of the PCISC2 FPGA 58, which makes the device visible to software through a conventional register set. In addition to this means of measuring on-board temperature, the power supply unit will be capable of detecting an over-temperature condition within the power supply unit itself.

The basic user interface consists of an LCD (liquid crystal display) panel 74, six buttons 76, and two LEDs (unit power and unit status) 74. The LCD 74 and buttons 76 reside on a subassembly which attaches to the main PCB via a cable and connector. The LCD 74 and button peripherals 76 are connected to the PCISC2 FPGA 58.

The PCI Bus 52 is provided by the IBM82660 chipset 48. It operates at 3.3 Volts and is compliant with PCI Specification Revision 2.0. The PCI Bus 52, like the rest of the Routing Device 34, is operated in big endian (also known as non-Intel) byte-order mode. Big endian is a format for storage or transmission of binary data in which the most significant byte comes first. The reverse convention is called little endian. PCI device configuration registers are required to operate in little endian mode for PCI compliance; therefore, software reorders bytes only when reading PCI device configuration registers. Two single-width PMC Connector slots 60 are provided for future expansion.

PCI based systems require a set of bus support functions (referred to as Central Resource Functions) that are usually not provided by a PCI Bridge such as the IBM82660 48. The Central Resource Functions in this design include a central arbiter, interrupt controller, and miscellaneous logic for individual device selection during PCI configuration cycles. These functions are provided in the PCISC2 FPGA device 58. In addition to the Central Resource Functions, this device 58 provides a bridge to a slower-speed eight-bit bus (X-bus) 62 which supports all non-PCI peripherals (flash memory 64, UARTs 70 etc.). The PCISC2 FPGA 58 provides bus buffering and control, address decoding, and chip select generation for X-Bus peripherals. The Ethernet® Interface 56 connects to the Ethernet® LAN subsystem. The Network Interface 54 connects to the IEEE 1394. The Network Interface 54 contains the physical layer interfaces (PHYs), link layer controller (LLC), and the power subsystem. The Network Interface 54 also programmed to communicate with the PowerPC™ 44 whereby the Network Interface 54 indicates to the PowerPC™ 44 when a packet has been received or sent. Software code, which is resident in System Memory 50, is executed by the PowerPC™ 44 to control the operation of the Network Interface 54. The software code is discussed subsequently in FIGS. 5–9.

The Edge Server Device is designed based on industry standard personal computer architecture using commercially available components. Intel® Pentium Pro® processor-based mother boards are used. Further the operating system is Windows NT™ 4.0. Therefore the Edge Server device uses the native remote access service for Windows NT™ to provide the functionality of a dialup router. The Edgeserver Module originates and terminates calls from the Analog-Digital Call Terminating Device 38 and the Digital Call Terminating Device 36. Therefore, the Edgeserver Module is able to answer and authenticate inbound calls and route them onto a corporate LAN using the IP protocol. The power subsystem, as shown in block 54 of FIG. 3 is integrated into the Edge Server device in order to power the PHYs and also power the network power bus. Further, the Edge Server device includes a Network Interface which programmed to communicate with the microprocessor whereby the Network Interface 54 indicates to the microprocessor when a packet has been received or sent. Software code, which is resident in System Memory 50, is executed by the PowerPC™ 44 to control the operation of the Network Interface 54. The software code is discussed subsequently in FIGS. 5–9.

Figure 4A:
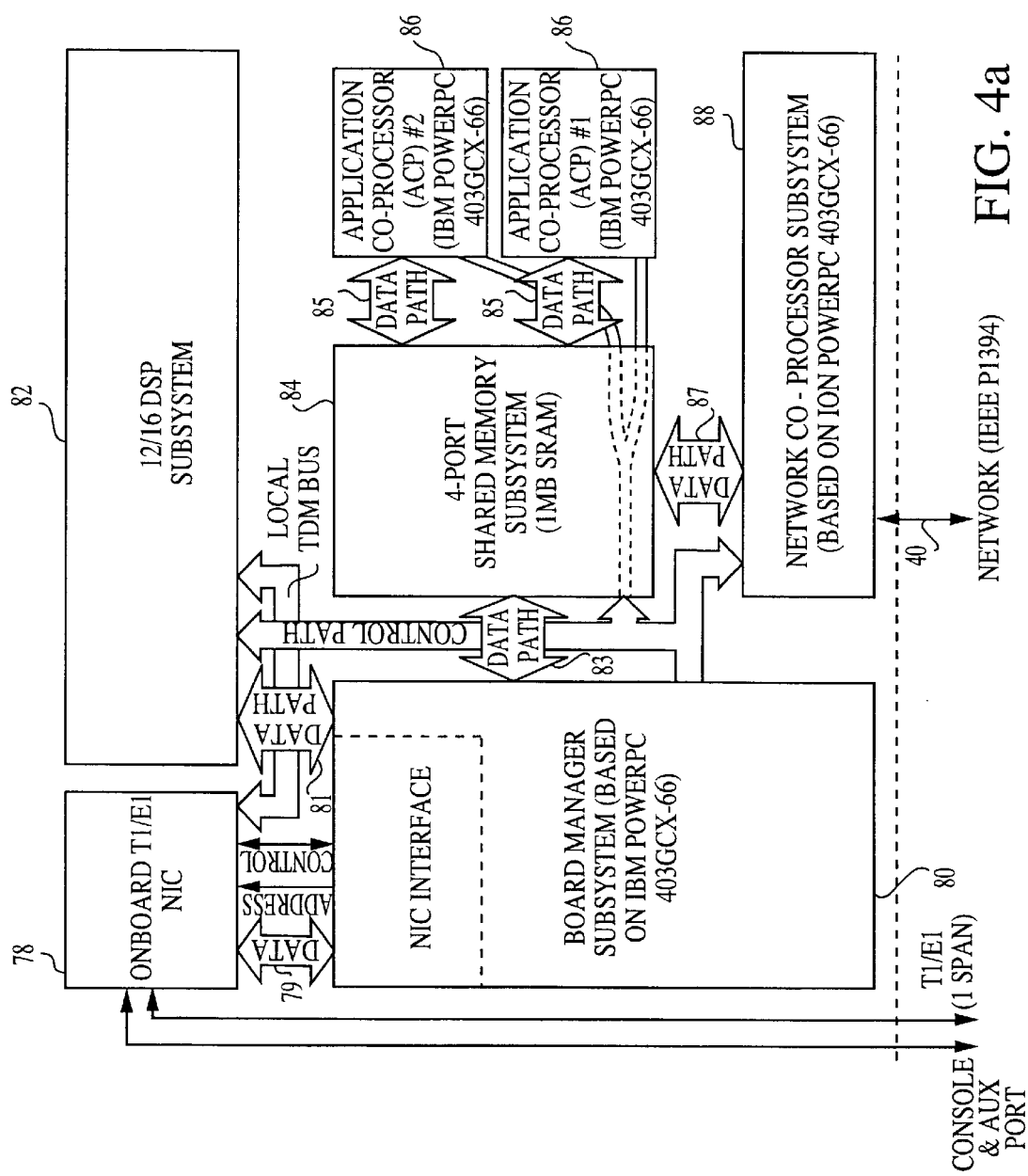
FIG. 4A is a block diagram of the Analog-Digital Call Terminating Device.

Referring to FIG. 4A, a block diagram of the Analog-Digital Call Terminating Device 38 is shown. The Onboard T1/E1 NIC (Network Interface Card) 78 provides an interface between the T1/E1 telephone lines and the remainder of the Analog-Digital Call Terminating Device 38. The Board Manager Subsystem 80 executes the software which controls the calls to and from the T1/E1 line. The Board Manager Subsystem-80, when receiving data from the T1/E1 line, sends the data to the DSP Subsystem 82 which contains 24 modems. The DSP Subsystem 82 may be expanded to include 30 modems. Subsequently, the Board Manager Subsystem 80 sends the data to the 4-Port Shared Memory Subsystem 84. The Network Co-Processor Subsystem 88 then takes the data in the Shared Memory Subsystem 84 and sends it onto the Network 40 for routing by the Routing Device 34. When sending data onto the T1/E1 line, the process is reversed in that the data is taken from the Shared Memory Subsystem 84, sent to the DSP Subsystem 82, through the Onboard T1/E1 NIC 78, and then to the T1/E1 line.

The various subcomponents of the Analog-Digital Call Terminating Device 38 communicate with each other via data buses, as shown in FIG. 4A. Further, there is a local time division multiplex line connecting the DSP Subsystem 82 with the Onboard T1/E1 NIC 78, as discussed in further detail subsequently.

Figure 4B:
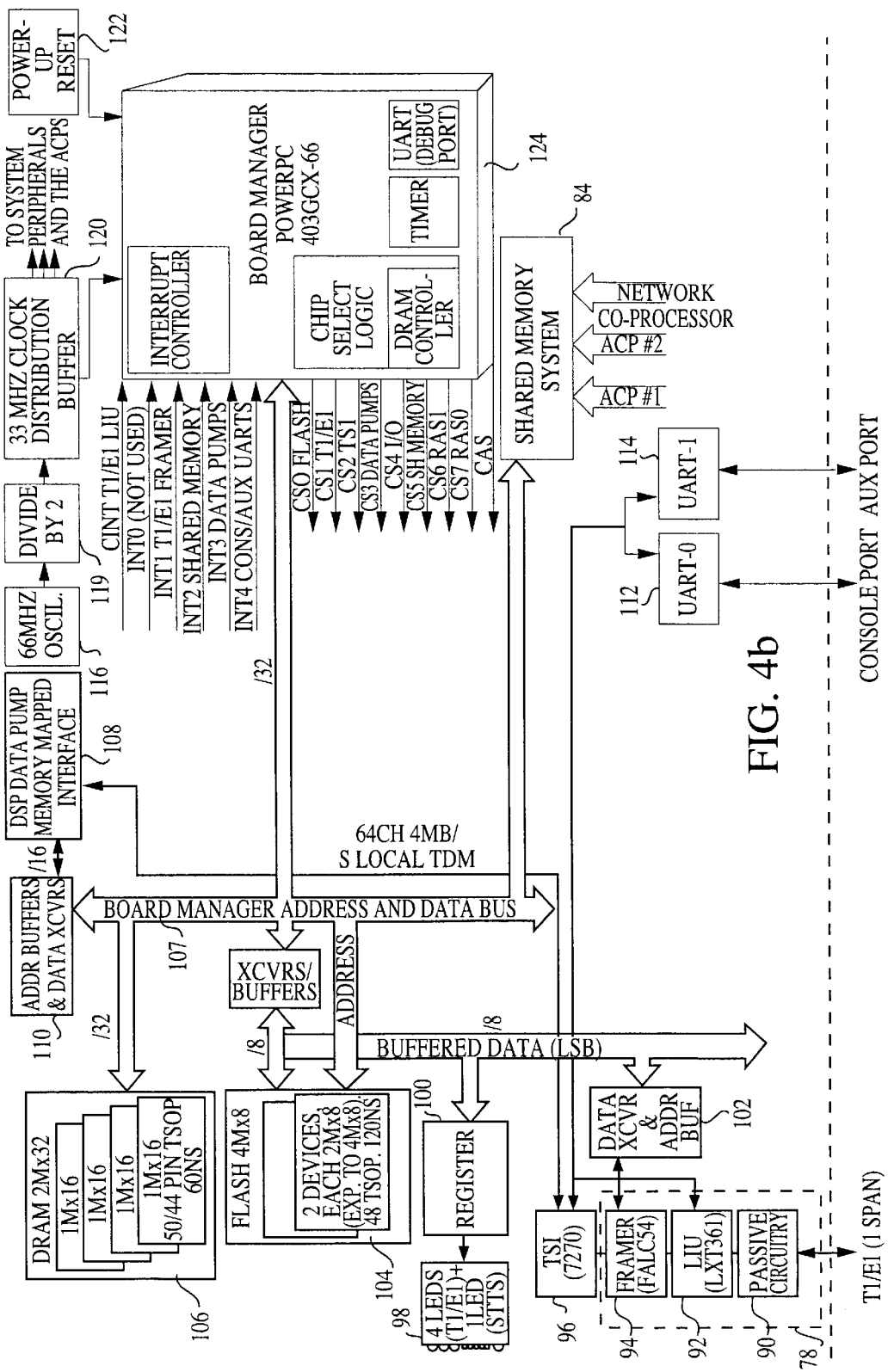
FIG. 4B is a block diagram of the Onboard T1/E1 NIC, Board Manager Subsystem, DSP Subsystem and Shared Memory Subsystem of the Analog-Digital Call Terminating Device.

FIG. 4B shows a more detailed block diagram of the Onboard T1/E1 NIC 78, Board Manager Subsystem 80, Shared Memory Subsystem 84 and DSP Subsystem 82 of the Analog-Digital Call Terminating Device 38. The passive circuitry 90 contains transformers and protection devices to protect from any spikes in the voltage on the T1/E1 line. The passive circuitry 90 also matches the impedance to the T1/E1 line. The Line Interface Unit (LIU) 92, part number LXT361, is the physical layer interface, acting as a line driver/receiver. The Framer 94 handles all of the T1/E1 framing and transmit framing tasks. The Time-Slot Interchanger (TSI) 96 allows the time slots to be remapped when sent back onto the T1/E1 line. The 64 channel Local Time Division Multiplex (TDM) bus is connected between the Time-Slot Interchanger 96 and the DSP 108. The Board Manager PowerPC™ model number 403GCX-66 also communicates with memory devices, FLASH 104 and DRAM 106. The Board Manager Address and Data Bus 107 connects the Board Manager 124 with the DSP Subsystem 82, the Shared Memory System 84 and the Onboard T1/E1 (NIC) 78, as indicated by the data paths in FIG. 4A (81, 83, 79).

Figure 4C:
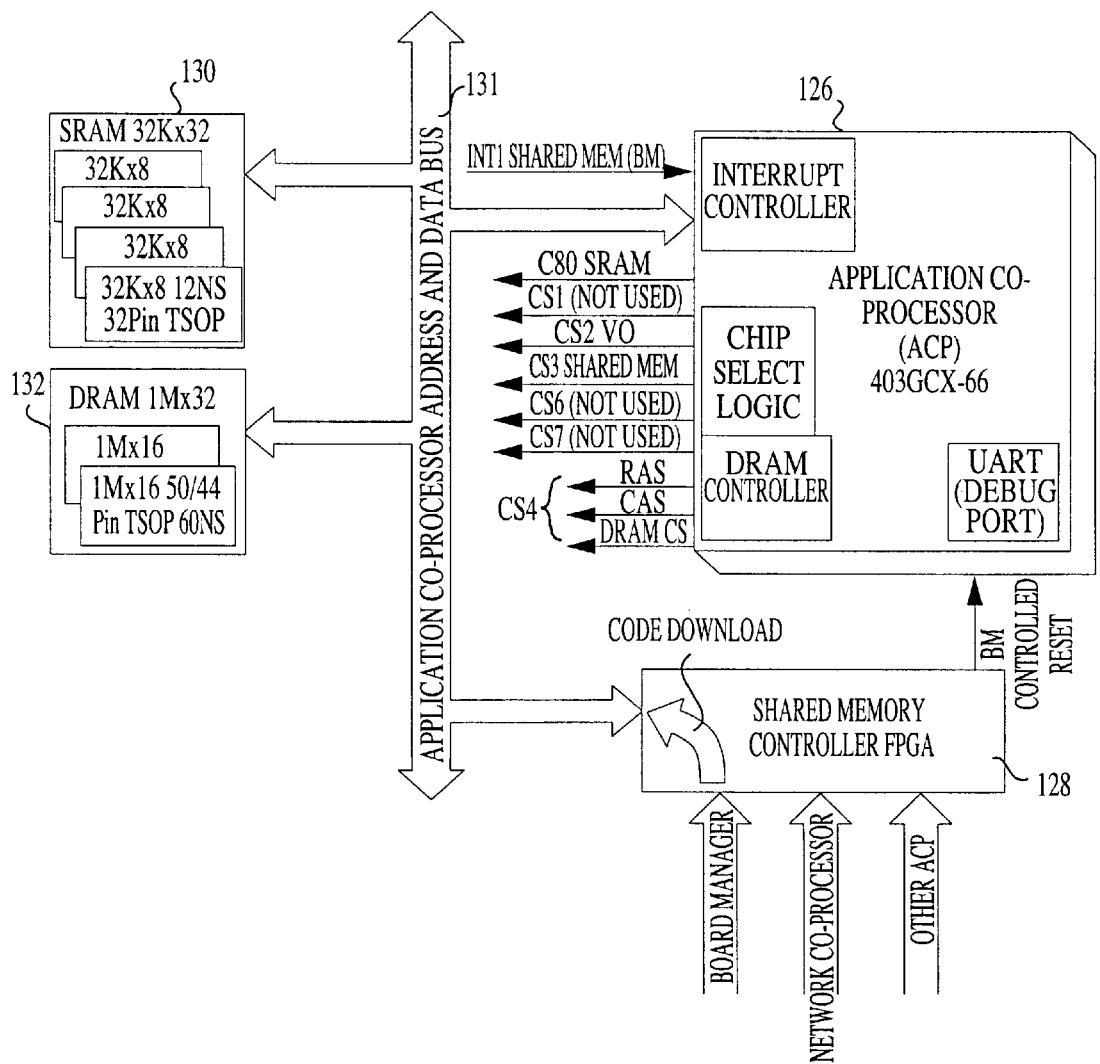
FIG. 4C is a block diagram of the Application Co-Processor and Shared Memory Controller of the Analog-Digital Call Terminating Device.

FIG. 4C shows a more detailed block diagram of the Application Co-Processor 126, PowerPC™ model number 403GCX-66, in combination with the Shared Memory Controller 128 and SRAM 130 and DRAM 132 memory devices. The Application Co-Processor Address and Data Bus 131 connects the Application Co-Processor 126 with the Shared Memory Controller 128, the SRAM 130 and DRAM 132, as indicated by the data path in FIG. 4A (85).

Figure 4D:
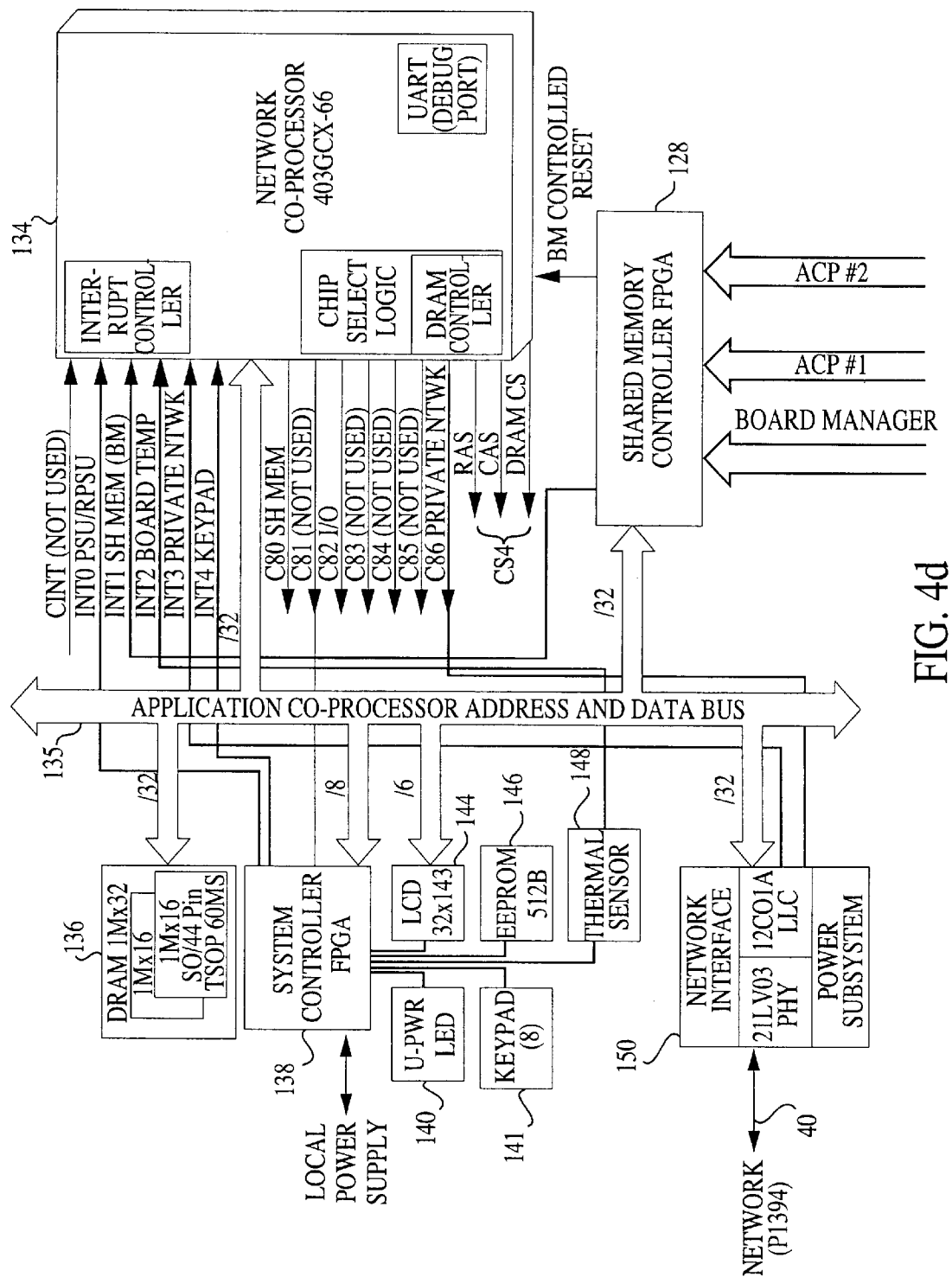
FIG. 4D is a block diagram of the Network Co-Processor Subsystem and Shared Memory Controller of the Analog-Digital Call Terminating Device.

FIG. 4D shows a block diagram of the Network Co-Processor 134, PowerPC™ model number 403GCX-66. The Network Co-Processor 134 is the interface for the Analog-Digital Call Terminating Device 38 to the IEEE 1394. The System Controller FPGA 138 is for monitoring the primary power supply and the backup power supply, allowing the Network Co-Processor 134 to control the local power supply. The Network Interface 150, similar to the Network Interface 54 for the Routing Device 34, connects to the IEEE 1394. The Network Interface 150 contains the physical layer interfaces (PHYs), link layer controller (LLC), and the power subsystem. The Network Interface 150 is also programmed to communicate with the Network Co-Processor 134 whereby the Network Interface 150 indicates to the Network Co-Processor 134 when a packet has been received or sent. Software code, which is resident in DRAM (Dynamic Random Access Memory) 136, is executed by the Network Co-Processor 134 to control the operation of the Network Interface 150. The software code is discussed subsequently in FIGS. 5–9. The Network Co-Processor Address and Data Bus 135 connects the Network Co-Processor 134 with the Shared Memory Controller 128, as indicated by the data path in FIG. 4A (87).

Figure 5:
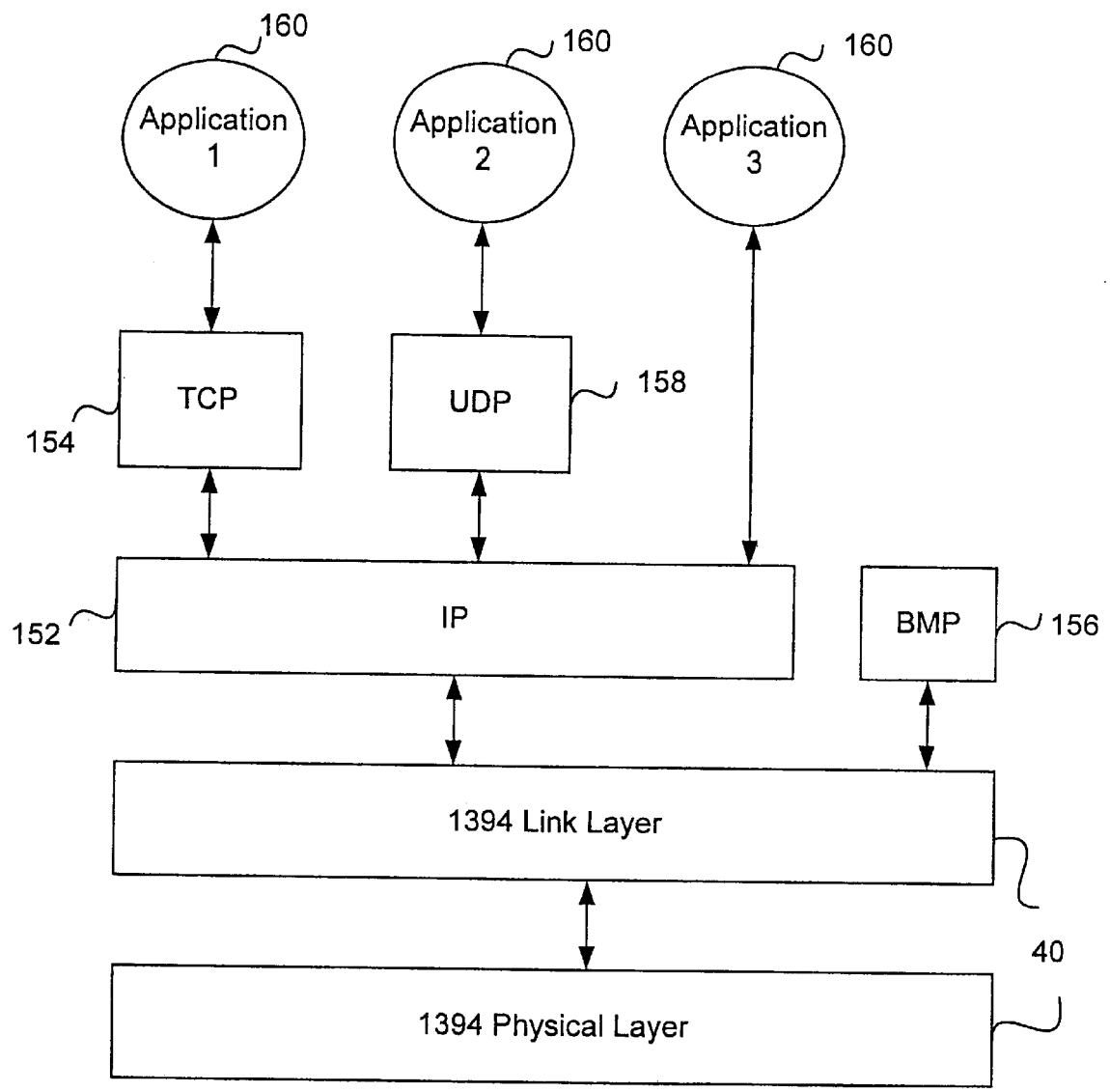
FIG. 5 is a block diagram of the layered architecture of the network.

Referring to FIG. 5, a system using a layered architecture model is shown with the IEEE 1394 high speed serial bus 40 providing the physical and link layer finctions and the TCP/IP 152, 154 serving as the transport layer. The Bus Management Protocol (BMP) 156 is responsible for management of the network, such as the selection of the network manager and the optimization of the IEEE 1394 bus. The User Datagram Protocol (UDP) 158 is also a transport layer protocol providing connectionless mode protocol.

The network uses the IP protocol as the transport protocol for data transfers over the IEEE 1394 bus 40. The IP protocol uses logical addresses to identify each node in the network with the IP addresses as 32-bit values depicted in dotted-decimal fashion (e.g., 149.112.234.1 for one application and 149.112.234.2 for another application). An application that needs to transfer data to another application will use the IP address to direct the data transfer (e.g., use the IP address 149.112.234.2 to transfer data to the second application). Each node on the network is configured with an IP address within the network range that uniquely identifies the node. For a network supporting up to 63 nodes, it is sufficient to use a single Class C IP network address. The network can support IP address assignment to the individual modules in the network. Further, for a single IP network, the IP addresses are assigned such that all nodes are on the same IP network and no two nodes have the same IP address. The IP addresses are assigned to the nodes through the Net-Topology-Update packet, which is described subsequently.

On the other hand, IEEE 1394 uses the physical address of the destination node. FIG. 3A is the format of the IEEE 1394 physical layer address. It uses a 16-bit wide address formed by the concatenation of the 10-bit bus number and the 6-bit node number. The network may support the bridging of multiple IEEE 1394 buses with the differing buses distinguished by the 10-bit bus number. In an embodiment which uses a single IEEE 1394 bus configuration, the first 10-bits of the IEEE 1394 address need not change across bus resets. The 6-bit node number results in a total address space of 64 addresses per IEEE 1394 bus. Address $FFFF_{16}$ is used as the broadcast address for the bus, thereby resulting in an effective address space of 63 addresses. The 6-bit node address for the IEEE 1394 is generated dynamically by the 1394 bus during bus initialization, resulting in a potentially different IEEE 1394 address for the same node across bus resets. A bus reset occurs whenever there is a reconfiguration of the network (i.e. whenever a node is inserted or removed from the network). Therefore, the IEEE 1394 is unlike other physical layers in that it is not programmed with an address for the node which is constant when the system is reconfigured.

In order to transfer data over the IEEE 1394 physical layer, a conversion between the IP address to the physical address must be performed. However, this conversion cannot be accomplished through prior methods such as an Address Resolution Protocol (ARP) since most RP's are not designed to support dynamic changing of the hardware address (which the IEEE 1394 does) and since the ARP is inefficient sending a broadcast request. This conversion may be accomplished through an address resolution scheme whereby a look-up table is used to map the IP address to the appropriate IEEE 1394 address. Though implemented using IP and IEEE 1394 addresses, other protocols may be substituted for the IP or IEEE 1394 protocols when implementing the address resolution scheme using a look-up table. Further, the address resolution scheme may be implemented at any layer of the computer architecture (e.g., physical, data link, network, transport, session, presentation, or application layers).

Figure 6A:
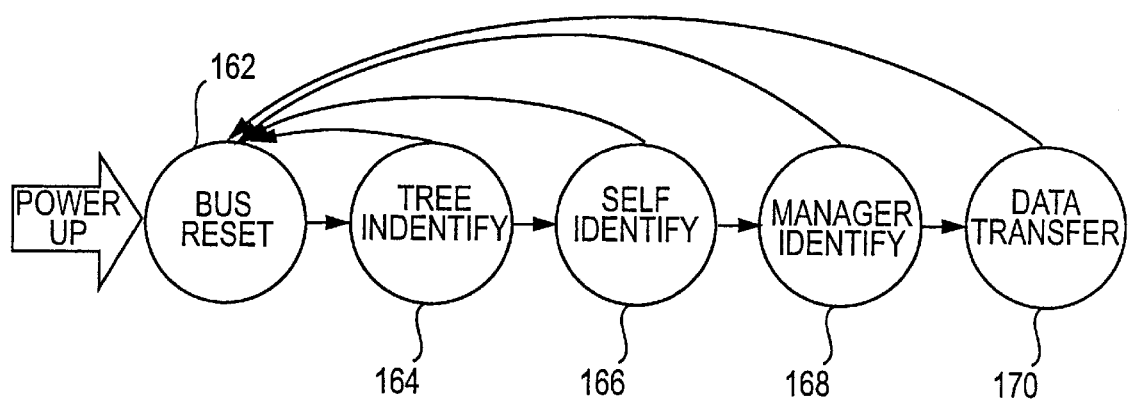
FIG. 6A is a state machine of the initialization of the network.
Figure 6B:
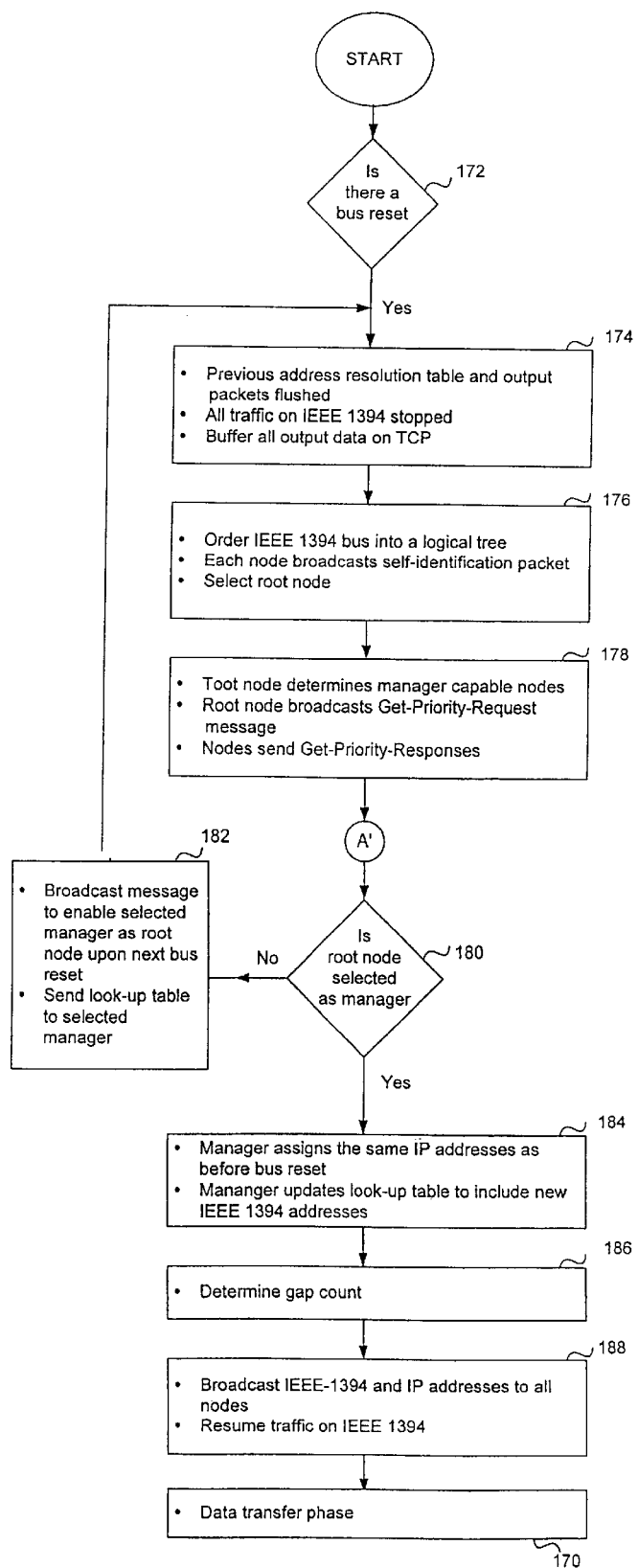
FIG. 6B is a flow chart of the initialization of the network corresponding to the state machine in FIG. 6A.

FIG. 6A is a state machine and FIG. 6B is a flow chart of the initialization process of the network with the preferred software listing below. The software, which is attached as an Appendix and incorporated herein by reference, is written in the "C" programming language and is executed on the IBM/Motorola PowerPC™ microprocessor. The software implements the procedures disclosed in FIGS. 5, 6A, 6B, 8, and 9. The reader's attention is directed to the notice regarding copyright set forth at the beginning of this document.

Referring to FIG. 6A, the Bus Reset state 162 is entered when a system power up occurs or when a node is inserted in or removed from the network. The main function of this state is to ensure that the reset signal is propagated to all the nodes so that all IEEE 1394 nodes enter the reset phase. The Bus Reset state 162 may be entered at any phase of network operation in order to maintain maximum flexibility of the system, as denoted by the arrows in FIG. 6A. In the Bus Reset state 162, the IEEE 1394 physical layer chip detects the insertion or removal of a node and sends a reset signal onto all of the ports for a period of time to ensure that the entire bus sees the signal. In other words, a bus reset occurs whenever the network is reconfigured by insertion or removal of a node. The 1394 link controller also sends an interrupt to indicate the entry into Bus Reset 172, as shown in FIG. 6B. The previous address resolution table (based on the Net-Topology-Update discussed subsequently) and any output packets buffered in the 1394 driver are flushed. All IP traffic on the IEEE 1394 interface is stopped and resumed only upon entering the Data Transfer phase. In keeping with the ability to insert or remove a node from the network without affecting data traffic between other nodes in the network, existing TCP connections between nodes, other than the node being inserted/removed, are not reset upon entering the Bus Reset state. Further, the TCP/IP protocol is not informed of any change in the state of the network and the applications using the network are not notified of the bus reset event. The TCP/IP protocol itself is not affected in any way and data transfers from the application to the protocol stack continue as before. All output data on a TCP session will be buffered by the protocol stack during the initialization phase until the flow control window closes 174. At this point, the application will not be able to transfer more data to the protocol stack. When the Data Transfer phase is entered, the flow control window will be opened again, allowing for data transfers to continue on the session. For data which is input, upon entering the Bus Reset phase, input data buffered by the TCP session will continue to be transferred to the application. Once all buffered input data has been transferred to the application, no more data will be transferred to the application until the Data Transfer phase is entered.

Next, the tree identify state 164 results in the ordering of the IEEE 1394 bus into a logical tree with one node as the root 176. Each node waits to receive a signal from a "child" node, which is of lower priority. If the node receives a "child" signal, then it sends a message to its "parent" indicating that the node is a "child" and that the node has a "child" as well. In this manner, the logical tree is formed so that all the nodes know their place in the tree, from the lowest leaf to the highest root. The root node, which has the highest natural priority for access to the IEEE 1394 bus, is selected via an arbitration process in the case of multiple root-capable nodes.

Each node forgets its IEEE 1394 address it had prior to the bus reset. The lowest leaf then gets the node address of zero. The next highest node receives the node address of one, and so on until the root node receives the highest IEEE 1394 node address. If a module is removed or inserted, the tree structure may be disrupted so that the IEEE 1394 addresses, which are based on the tree structure, may be different across bus resets. Therefore, the IEEE 1394 addresses change dynamically since software is not able to guarantee that a node will have a certain IEEE 1394 address across a bus reset.

After the logical tree is formed, the self-identify phase 166 is entered. Each node on the network acquires a new 1394 physical address and advertises it to the network by broadcasting the self-identification packet 176. The format of the self-identification packet is referred to in FIG. 7B. The first two bits (10) indicate that the format is a self-identification packet identifier.

The phy_ID is the physical node identifier of the sender of the packet. Other items in the self-identification packet include: L (active Link transaction layer); gap_cnt (current value of node's gap count); sp (speed capabilities); del (worst case repeater delay); c (node is contender for manager of the network, which is discussed subsequently); pwr (power consumption); p0, p1, p2 (port status); i (indicates if node initiated reset); and m (indicates if a second self-identification packet will be sent).

The self-identification packets are essentially broadcast on the network with each node building. a table of self-identification packets to determine the 1394 address of the root node 34. he root node has the highest 1394 address so that, upon completion of the self identify phase 166, all nodes on the network know the 1394 address of the root node 176.

After the self-identify phase 166, the root node selects the node which will be the manager of the network based on the self-identification packets during the Manager identify phase 168. The root node searches the list of self-identification packets to determine the manager capable nodes in the system. If there are no manager capable nodes, the root node detects an error condition. If the root node determines that there is at least one manager capable node, the root node broadcasts a Get-Priority-Request message 178 to obtain the capability, priority, current IEEE 1394 address and the network identifier (NID) of each node.

Figure 7A:
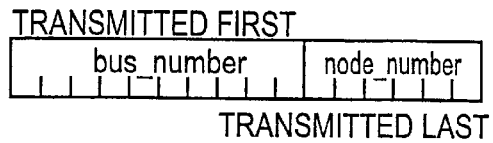
FIG. 7A is the format of the IEEE 1394 address.
Figure 7B:
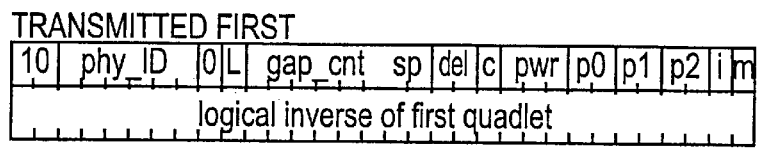
FIG. 7B is the format of the self-identification packet used during initialization of the network.
Figure 7C:
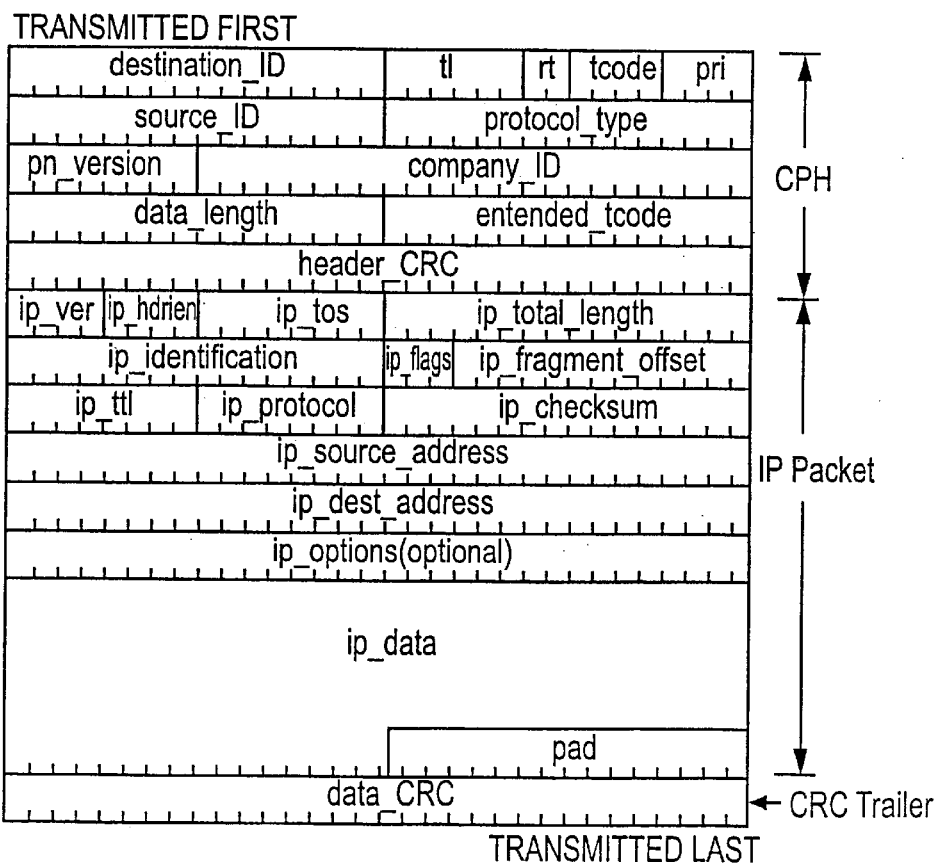
FIG. 7C is the format for the IP packet encapsulated in the IEEE 1394 packet.
Figure 7D:
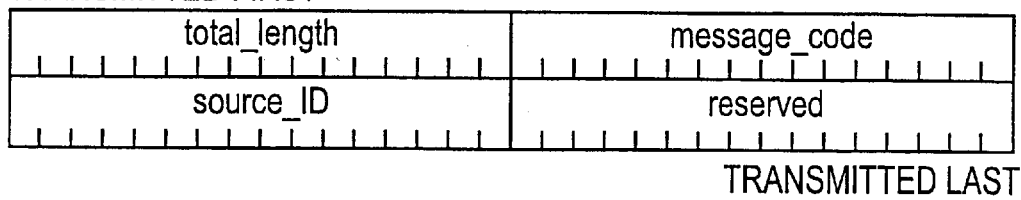
FIG. 7D is the format for the Get-Priority-Request.

Referring to FIG. 7D, the Get-Priority-Request is sent to obtain the network identifier and the priority of all the nodes on the network. The Get-Priority-Request consists of: total_length (16 bits) which is the total length of the message in octets; message code (16 bits) which is set to one (1) for Get-Priority-Request; source_ID (16 bits) which is the IEEE 1394 node ID of the sending node and is the concatenation of the 10-bit source bus ID and 6-bit physical address (as shown in FIG. 7A); and reserved (16 bits) which is set to zero(0).

The network identifier is a unique 32-bit network identifier which is hardwired into each node during manufacture in the factory. The nodes then send Get-Priority-Responses 178. Based on the Get-Priority-Response of each node to the Get-Priority-Request message, the root node selects the manager of the network. Further, the Get-Priority-Response is used to maintain consistency of IP addresses across bus resets, as discussed subsequently.

If the root node itself is selected as the manager of the network, the initialization continues 180. However, if a node other than the root node is selected as the manager of the network, the root node then broadcasts a message to enable root connection to the node which was selected as the manager of the network upon the next bus reset 182. The root node also transmits the look-up table of addresses, which is discussed subsequently, to the node which was selected as the manager of the network 182. The current root node then initiates a second bus reset so that the new configuration will take effect. Upon the second bus reset, the node which was already selected as the manager of the network, upon reset, will also be chosen as the root node so that the initialization continues.

The manager of the network 190 then assigns the IP addresses to the nodes 184. In order to support the hot-swap capability, the assignment of IP addresses must be done such that nodes that were assigned IP addresses before this bus reset (i.e. the bus reset that caused the manager of the network to be selected) must be assigned the same IP address. Otherwise, whenever a node is inserted or removed from the network, the IP interface must be brought down with all of the IP data structures being reinitialized. Because of this hot-swap capability, the IP interface is left in tact with the IP still "believing" that it is. talking to the physical and link layers as before the insertion or removal of the node from the network.

Figure 8:
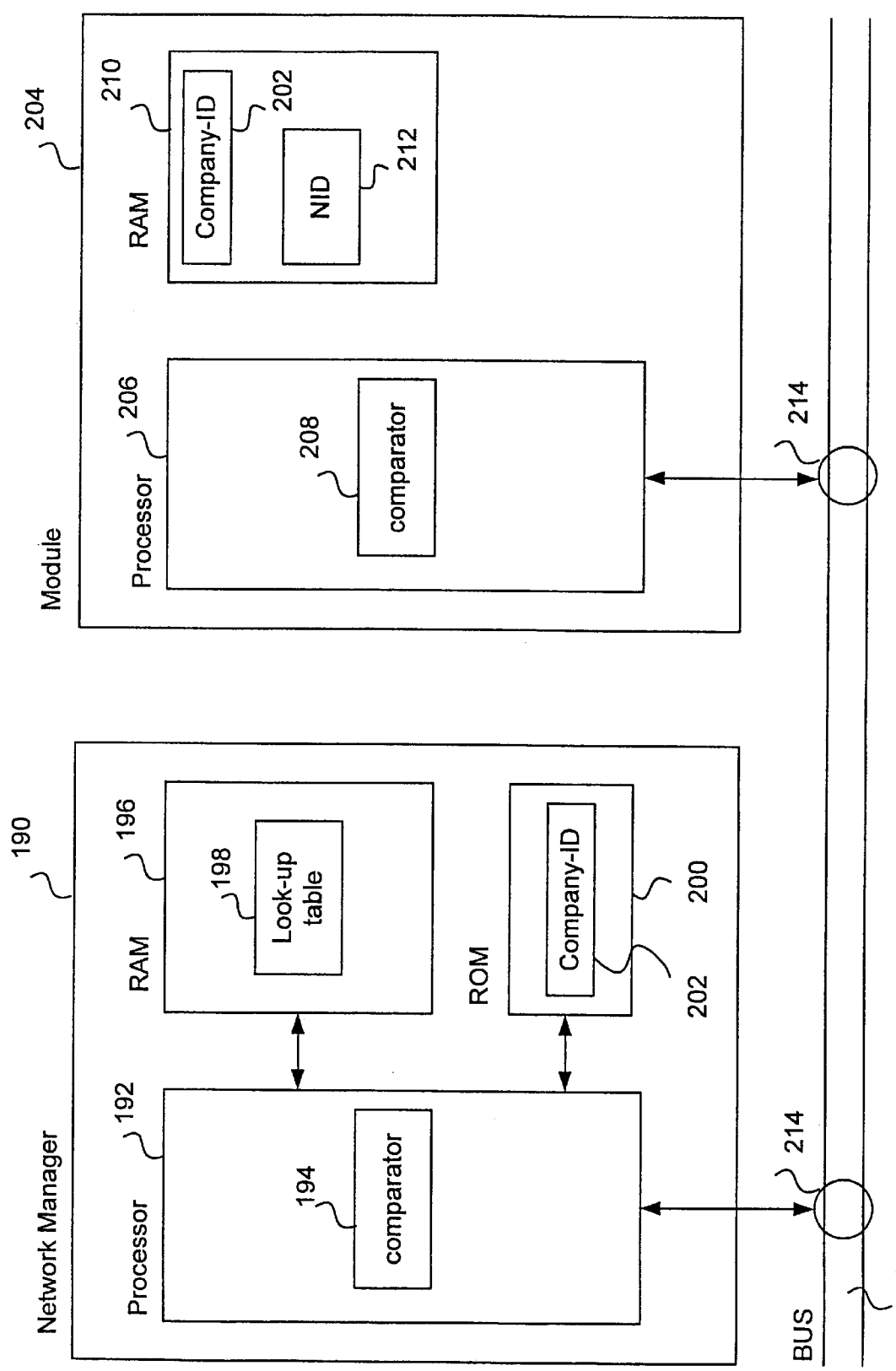
FIG. 8 is a block diagram of the network manager and module.

In order to accomplish this hot-swap feature, the manager of the network 190 uses a look-up table 198 in a memory device 196, such as a Random Access Memory (RAM) device. The look-up table 198 contains the network identifier (ND) and the corresponding IP address and IEEE 1394 address prior to the bus reset. Besides being unique for each node, the network identifier never changes for the lifetime of the node. Thus, while the IEEE 1394 node address as well as the IP node address may change upon bus reset, the network identifier does not. therefore, the network identifier acts as a permanent unique node identifier, and the 32-bit network identifier space is sufficiently large enough such that it may be segmnented-to allow for various pieces of information specific to the node, such as module type information. The 32-bit network identifier does not have any specific formatting requirements other than the requirement that it be unique. Further, the NID 212 is programmed into the node using a ROM 210, as shown in FIG. 8, or other means which will allow for the network identifier address to be constant across a bus reset. The network identifier, while programmed at the factory, may also be programmed by the user. In addition, the network identifier may be changeable during periods of operation but other than during an insertion or removal of a node from the network; however, as stated previously, the network identifier must be constant across an insertion or removal of a node from the network. Other means may be employed which allows for the node to maintain a unique node identifier between bus resets. For example, the network identifier can be stored in flash memory or some other memory which will be constant across a bus reset. Or, the network identifier can be taken from other sources in the module, such as the serial number which is programmed into the module at the time of manufacture.

Figure 7E:
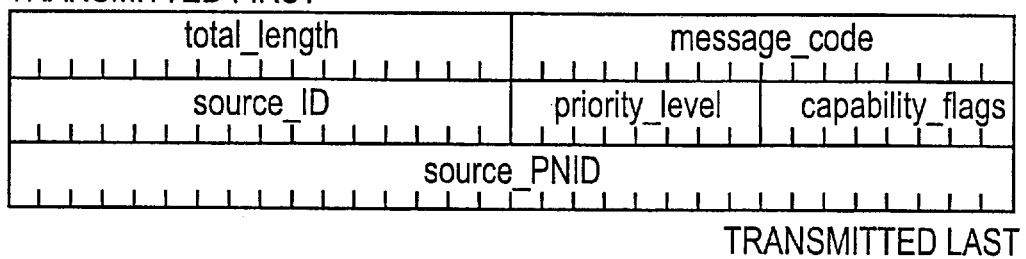
FIG. 7E is the format for the Get-Priority-Response.

Based on a look-up table 198, referred to in FIG. 8, and based on the Get-Priority-Responses (which contains the network identifier for the specific node), the manager of the network determines the previous IP address for a specific network identifier. The Get-Priority-Response is sent in response by a node to a Get-Priority-Request message. This message is sent to the address specified in the Get-Priority-Request message in the "source_ID" field, as shown in FIG. 7D. Referring to FIG. 7E, the Get-Priority-Response consists of: total_length (16 bits) which is the total length of the message in octets; message code (16 bits) which is set to two (2) for Get-Priority-Response; source ID (16 bits) which specifies the IEEE 1394 node ID of the sending node and is a concatenation of the 10-bit source bus ID and the 6-bit IEEE 1394 physical address (as shown in FIG. 7A); priority_level (8 bits) which is the priority level of this node in the range of 0–255 with 255 being the highest priority; capability_flags (8 bits) which is the bit flags indicating the management capabilities of this contender; and source_PNID (32 bits) which is the network identifier for the node (as discussed previously).

The manager builds a temporary look-up table which maps the current IP addresses for the specific network identifiers. The manager then uses its comparator 194 in it processor 192 to compare the values in the historical look-up table 194 which contains the network identifier and the previous IP and IEEE addresses with the Get-Priority-Responses. The processor 192 then determines the previous IP address for the specific network identifier. The network manager 190 then assigns the previous IP address before the bus reset to the node for the specific network identifier. After all of the nodes are assigned their previous IP addresses, a new look-up table is created, deleting the nodes which were removed and adding the IP and IEEE 1394 addresses for the nodes that were inserted. Thus, based on the look-up table, each node which was in operation prior to bus reset will be assigned the same IP address as before the bus reset.

After the IP and IEEE 1394 addresses are determined, the-gap count, which is a number that is used by the IEEE 1394 physical layer chip in the calculation of the time between packet gaps, is optimized 186. The gap count is a factor of the number of nodes connected to the bus, and is set to the maximum value of $3F_{16}$ upon bus reset. The manager optimizes the gap count by calculating a new gap count for the IEEE 1394 bus topology, and then broadcasts the new gap count to all of the nodes connected to the bus.

The final phase of the state diagram in FIG. 6B is the Data Transfer State 170 and is entered after completion of the Manager Identify state 168. The Manager Identify state 168 is completed when the results of the IP address assignment and the IEEE 1394 addresses are broadcast to all nodes 188, which is the Net-Topology-Update. Upon receipt of the results of the address assignment, a node resumes transfer of IP packets on the IEEE 1394 interface. Further, all nodes remain in the Data Transfer phase until a bus reset is caused on the network.

In an alternative embodiment, the address resolution scheme can prevent disturbances in the on-going traffic in both higher and lower layers in the computer architecture. In the previous embodiment, the on-going traffic was not disturbed at the IP layer and above. Further, due to limitations in the IEEE 1394 specification, which only allows for dynamic addressing, the addresses for the IEEE 1394 cannot be maintained with certainty across bus resets. However, for protocols which allow for assignment of addresses at the physical and link layers, rather than dynamic generation or programmed addresses during manufacture, the on-going traffic at the link layer and below can be maintained due to continuity of addresses across bus resets. During a bus reset at the physical layer, the data on the physical layer bus may be corrupted due to the insertion/removal of a new node (which caused the bus reset). However, data on the drivers, which were previously formatted but not yet put out on the bus, can be maintained through the address resolution scheme. Therefore, using both the network identifiers and the look-up table which contains the previous addresses for the nodes, the same addresses can be assigned so that traffic can remain undisturbed across a bus reset. Further, the address resolution scheme can also be used in swapping any connection at any layer or hierarchy of the computer architecture, from the physical layer to the application layer. Moreover, the process and apparatus can be used with any computer architecture to protect disturbances at any node within the computer architecture.

In this manner, different modules may be inserted or removed from the network without disturbing the on-going traffic on the system. For example, referring to FIG. 2, nodes such as the Router device 34, Digital Call Terminating Device 36, and Analog-Digital Call Terminating Device 38 can be inserted or removed from the network without disturbing the on-going traffic. Ordinarily, the Router Device 34 is chosen as the manager of the network, so that the Router Device 34 will contain the look-up table which is used to assign the same IP addresses for other devices such as the Digital Call Terminating Device 36 or the Analog-Digital Call Terminating Device 38 as before the insertion or removal of another module on the network 40.

A second aspect which is incompatible between the IEEE 1394 and the IP are the protocols between the sender and receiver. The IEEE 1394 assumes that the sender or receiver is not an "intelligent" device and is not intended for channel based I/O. In other words, the IEEE 1394 link layer specification includes a memory read/write data transfer scheme, where the requesting node specifies the memory location of the read/write action in the destination node. Therefore, the IEEE 1394 protocol includes information on the sender's or receiver's memory architecture, such as the specific location in memory for the read or write. IP, on the other hand, is intended for channel based I/O and assumes that the sender or receiver is sufficiently intelligent to process the data without memory architecture being included in the packet. To reconcile this difference, the data transfer scheme as specified by the IEEE 1394 is modified to transfer IP packets over IEEE 1394. The network taansfers the packets using addressed data writes to transfer data. Addressed data transfers allow for more flexibility in the handling of the data by the receiving node, whose memory architecture can be very different from the sending node. Further, the sending node need not be aware of the memory architecture of the receiver which allows for greater scaleability of the system.

As referred to in FIG. 7C, the Common Packet Header (CPH) contains the information that the IEEE 1394 examines to determine the routing of the packet. The IEEE 1394 does not have a field in which to determine what type of protocol is encapsulated in its packet, i.e. what type of payload it is carrying. Further, the common packet header of the IEEE 1394 ordinarily contains the destination offset field in order to comply with the IEEE 1394's requirement of including memory architecture information.

Modification of the IEEE 1394 packet header is done to integrate the IEEE 1394 with the IP protocol. In particular, the IEEE 1394, through its specification, has a field in the header which has memory information (i.e. where the packet is to be written to or read from) of the target of the packet of data. However, to integrate the two protocols, the field is modified, putting in the "protocol type" field in the packet header. This is done so that the module that receives the packet will examine the field with the protocol_type and determine from where the packet was sent from (i.e. the IP or the BMP). In this manner, the receiver module determines what type of data it is carrying via the "protocol_type" field in the packet header as shown in FIG. 7C. The protocol_type field is 16 bits and specifies the protocol of the packet encapsulated in the data field. For the architecture disclosed in FIG. 5, the protocol_type field values are either BMP (Bus Management Protocol) or IP (Internet Protocol) to signify to the IEEE 1394 that the data field encapsulated in the IEEE 1394 packet either corresponds to the BMP protocol or to the IP protocol. The following protocols are defined: BMP ($0101_{16}$); IP ($0800_{16}$). In this manner, the protocol of the packet, according to the configuration of the system as shown in FIG. 5, can be identified to the IEEE 1394 indicating the type of data contained in the data field. The protocol_type field may be modified based on the configuration of the system to indicate the type of packet encapsulated in the field. Thus, the IEEE 1394 memory read write function is modified so that, instead of parsing the fields to determine where to write to or read from, the function examines the protocol_type to determine where the packet is from and thereafter how to process the packet.

Other fields in the Common Packet Header include: destination_ID which specifies the IEEE 1394 node ID of the receiving node (as discussed above with reference to FIG. 7A); tl which is the transaction label (unused and set to zero); rt which is the retry code (the network does not use the IEEE 1394 capability to resend data if the data that was previously send was not received properly; therefore, the retry code is set to zero); tcode which is the transaction code specifying the packet format and type of transaction to be performed (the IEEE 1394 receivers use the tcode to determine the 1394 header format); pri which is the priority (this field is unused and set to zero); source_ID which specifies the IEEE 1394 node ID of the sending node (with the format of FIG. 7A); protocol_type which specifies the protocol of the packet encapsulated in the data field (two protocols are defined, one for the BMP and one for IP); pn_version which is the network version number; company_ID which is discussed subsequently; data length which is the total length of the data field in the number of bytes; extended_tcode is the extended transaction code which is set to zero; header_CRC which is the computed cyclic redundancy check for the CPH portion of the packet; data field which is the data to be transferred in the packet; and data_CRC which is the computed cyclic redundancy check, using the same algorithm used to compute the header_CRC.

Further, if the IP packet is not a multiple of 4, then the data field is padded by one or more zero bytes to align the data field end on a quadlet boundary. The IP packet is then followed by the cyclic redundancy check (CRC) which checks the integrity of the data field.

The company_ID indicates the specific company that manufactured the network and is used as a packet identifier or a data stream identifier (i.e. identifying the origin of the packet or the data stream). This is added in the common packet header in order to add robustness to the system. The company_ID is used (1) in terms of assigning addresses and (2) in terms of determining whether to process a packet. First, after a node is inserted or removed from the network, the IP addresses are assigned, during the Manager Identify phase 168, the same IP addresses prior to insertion or removal of the node. During the Manager Identify phase 168, the node sends a Get-Priority-Response in response to a Get-Priority-Request. Encapsulated in the Get-Priority-Response is the common packet header (CPH) as shown in FIG. 7C. The common packet header contains the company_ID which is sent by the module 204 sending the Get-Priority-Response to the Manager of the Network 190. The module 204 accesses ROM 210 to retrieve the company_ID 202 to formulate the common packet header. The Manager of the Network 190, when assigning IP addresses during the Manger Identify phase 168, determines whether a node is network compatible, based on the company_ID in the Get-Priority-Response. The Manager of the Network 190 uses the comparator 194 in the processor 192 to determine whether the company_ID field in the packet header is the same as the value stored in the ROM 200 of the Network Manager 190. If the values are not the same, the Manager of the Network 190 does not assign an IP address to the node of the module which sent the Get-Priority-Response which did not contain the company_ID in the common packet header. In this manner, non-network modules do not interact with the higher layers of the computer architecture.

Second, it is important that non-network packets are discarded by the network with as little effect on the network as possible. In order to do this, each packet includes a specific manufacture identifier (company_ID) in the common packet header so that if any packet does not contain a valid company identifier field, it will be discarded by the receiver. Each module which is connected to the network via nodes 214 determines what the company_ID is. The sender module contains the company_ID 202 in its ROM 200. FIG. 8 shows that the sender module is the network manager 190. The sender module may be any network compatible module, including the network manager 190. The sender module retrieves the company_ID and formats the packet header with the company_ID in conformance with FIG. 7C. The sender module then sends the packet onto the bus. A module 204 receives the packet and determines whether to process the packet based on the field allocated to the company_ID. The module performs this receiving of the packet at the link layer. The company_ID 202 is hardwired into the module via a Read Only Memory (ROM) 210. Alternatively, the company_ID is sent to all modules during any reset to the bus so that the company_ID can reside in volatile memory.

Referring to FIG. 9, the module which receives the packet first determines the company_ID for compatible modules 216. When the module receives a packet from the bus 218, the module uses its processor 206 searches the packet header 220. The module then compares the packet with the company_ID using the comparator 208. If the header contains the company_ID in the correct portion of the header 222, the module processes the packet 224. Otherwise, the packet is not processed. Thus, if a non-network compatible device is connected to the system, modules which are not designed to process the packet may refuse the packet at the link layer and thereby not interfere with the module's processing.

From the foregoing detailed description, it will be appreciated that numerous changes and modifications can be made to the hardware and software aspects of the invention without departure from the true spirit and scope of the invention. For example, the present invention is not dependent on any specific type of computer architecture or type of protocol. This true spirit and scope of the invention is defined by the appended claims, to be interpreted in light of the foregoing specification.

We claim:

1. In a data processing system having a network bus, at least one component connected to the network bus and a network manager connected to the network bus having a memory, the component containing a non-changeable address and the component being assigned a changeable address, a method for reconfiguring the network without disturbing the on-going traffic comprising the steps of:
   A. obtaining the non-changeable address and changeable address for the at least one component;
   B. placing the non-changeable address and changeable address for the at least one component in the memory;
   C. resetting the network bus;
   D. determining the non-changeable address for the at least one component;
   E. examining in the look-up table the changeable address for the at least one component; and
   F. assigning the at least one component with the address which corresponds to the changeable address in the look-up table.

2. The method of claim 1, wherein the step of resetting the network bus comprises reconfiguring the network.

3. The method of claim 2, wherein the step of reconfiguring the network includes inserting a component onto a node of the network bus.

4. The method of claim 2, wherein the step of reconfiguring the network includes removing a component from a node of the network bus.

5. The method of claim 1, further comprising the step of dynamically generating the at least one component with a second changeable address.

6. The method of claim 5, wherein the memory farther contains a second changeable address for the at least one component prior to reconfiguring the network and further comprising the step of updating the memory with the second changeable address after the step of dynamically generating the at least one component with a second changeable address.

7. The method of claim 5, wherein the first changeable address is formatted under the Internet Protocol and the second changeable address is formatted under the IEEE 1394 protocol.

8. A data processing system for interconnecting components along a network, the data processing system comprising:
   a module being assigned an address, the module including a non-volatile memory, the non-volatile memory containing a network identifier address, the module also being assigned a changeable address which is assignable;
   a network manager having a memory device and a processor; the memory device containing the module's network identifier address and the module's changeable address for the layer; and
   the processor having a comparator, the comparator comparing the network identifier address in the memory device with the network identifier address in the module, the processor assigning the module the changeable address in the memory device for the layer of the module if the network identifier address in the memory device equals the network identifier address in the module.

9. A data processing system as claimed in claim 8, wherein the data processing system has a computer architecture with a vertical set of layers,
   wherein the module is assigned the address for a layer in the computer architecture, and
   wherein the module is also assigned a changeable address for the layer.

10. A data processing system as claimed in claim 9, wherein the layer that the module is connected to is the network layer.

11. A data processing system as claimed in claim 10, wherein the network layer is formatted under the Internet Protocol.

12. A data processing system as claimed in claim 10, wherein the memory device contains the module's network identifier address and the module's changeable address for the layer.

* * * * *